United States Patent
Wong et al.

(10) Patent No.: US 7,555,669 B2
(45) Date of Patent: Jun. 30, 2009

(54) TIMING VECTOR PROGRAM MECHANISM

(75) Inventors: Yuqian C. Wong, San Diego, CA (US); Yuan Zhuang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 757 days.

(21) Appl. No.: 10/932,491

(22) Filed: Sep. 2, 2004

(65) Prior Publication Data

US 2006/0020840 A1 Jan. 26, 2006

Related U.S. Application Data

(60) Provisional application No. 60/581,300, filed on Jun. 18, 2004.

(51) Int. Cl.
*G06F 1/04* (2006.01)

(52) U.S. Cl. .................................... 713/600

(58) Field of Classification Search ................ 713/600
See application file for complete search history.

(56) References Cited

U.S. PATENT DOCUMENTS

| | | | | |
|---|---|---|---|---|
| 6,115,360 A | * | 9/2000 | Quay et al. | 370/235 |
| 6,195,701 B1 | * | 2/2001 | Kaiserswerth et al. | 709/231 |
| 6,347,084 B1 | * | 2/2002 | Hulyalkar et al. | 370/347 |
| 6,496,848 B1 | * | 12/2002 | Nankaku | 718/100 |
| 6,870,875 B1 | * | 3/2005 | Partyka | 375/132 |
| 7,209,495 B2 | * | 4/2007 | Partyka | 370/527 |
| 2004/0031035 A1 | * | 2/2004 | Shiu et al. | 718/102 |

\* cited by examiner

*Primary Examiner*—Rehana Perveen
*Assistant Examiner*—Eric Chang

(57) ABSTRACT

Timing vectors are used to pass execution of time-dependent operations from firmware/software to a hardware component (e.g., a state machine). These vectors may be stored as a vector table in a data memory that is accessible by both the firmware/software and the hardware component. Based on the processing being performed in the system, the firmware/software will determine that one or more operations are to be performed at a certain time. The firmware/software stores a reference to that time and the operation(s) in a vector. The hardware component monitors time in the system and the vectors to determine whether the current time matches the time associated with a given vector. When there is a match, the hardware component causes the operation(s) associated with the vector to be performed. The system also may perform different operations at a given time depending on the operating condition (e.g., state) of the system.

37 Claims, 4 Drawing Sheets

TIMING VECTOR PROGRAM MECHANISM

CROSS-REFERENCE TO RELATED APPLICATION(S)

This application claims the benefit of U.S. Provisional Patent Application No. 60/581,300, filed Jun. 18, 2004, the disclosure of which is hereby incorporated by reference herein.

TECHNICAL FIELD

This application relates to data processing and, more specifically, to a system and method for controlling timing of processing operations.

BACKGROUND

In some conventional processing systems a processor may need to precisely track time to ensure that certain operations are performed at a certain time. For example, Bluetooth communication systems incorporate a frequency hopping scheme that involves continuous changes in the operating frequency of the transmitter and receiver. To accomplish a change in frequency a typical system writes a new frequency value to a programmable frequency synthesizer that generates the clock signal for the transmitter and receiver.

Design constraints in the system generally require, however, that these new frequencies may only be written to the frequency synthesizer at certain times. For example, in a typical system a new frequency value may not be written to the frequency synthesizer when the transmitter is transmitting data or when the receiver is receiving data. Otherwise, the current transmission or reception may be corrupted.

Typically, to ensure that operations are performed at the proper time the processor will periodically read a real time clock in the system to obtain the current time. In this way, the processor may correlate the current time from the real time clock with the proper time for doing an operation (e.g., changing the frequency of a frequency synthesizer).

Conventionally, the processor operation of checking the real time clock may be initiated by a polling routine or by an interrupt routine. In a polling routine the processor will repeatedly read (poll) the real time clock. In an interrupt routine the processor will be periodically interrupted (by, for example, a hardware timer or other hardware generated condition). Once interrupted, the processor will read the real time clock.

Polling or interrupt routines such as these may not perform time-dependent operations efficiently. For example, processor processing cycles may be wasted during execution of the polling routines. That is, the processor may spend a relatively large amount of time simply checking the real time clock to determine whether something needs to be done. In addition, interrupt routines may have problems associated with latency (e.g., the delay after the interrupt is initiated). In addition, when interrupts are prioritized (i.e., some interrupts are given higher priority) other interrupts may not be serviced as often as necessary. Moreover, there are usually a limited number of interrupts in any given system. Consequently, interrupts may be a relatively valuable and therefore scarce resource in a system.

SUMMARY

In one aspect, the invention relates to a system that offloads from a processor (e.g., CPU) operations that need to be performed at specific times.

In one embodiment of a system constructed in accordance with the invention (hereafter referred to simply as a "system"), one or more vectors are used to, in effect, pass execution of time-dependent operations from the processor (and its associated firmware and/or software) to a hardware component (e.g., a state machine). These vectors may be stored as a vector table in a data memory (e.g., a register) that is accessible by both the processor and the hardware component.

As an example, based on the processing being performed in the system, the processor will determine that one or more operations will need to be performed at a certain time. Rather than polling a real time clock to determine when to execute the operations, the processor (e.g., the firmware and/or software executing on the processor) stores a reference to that time and a reference to the operation(s) in a vector. In other words, each vector is defined to include a reference to a time and one or more operations to be performed at that time.

The hardware component may then be configured to, for example, continually (or frequently) monitor time in the system. In addition, the hardware component will monitor each vector to determine whether the current time matches the time associated with a given vector. When there is match, the hardware component causes the operation(s) associated with the vector to be performed.

In another aspect, a system may perform different operations at a given time depending on the operating condition (e.g., state) of the system. For example, a vector may include a reference to an operating condition of the system. In this way, the operation or operations to be performed at a given time (as defined in the vector) may depend on the current operating condition of the system.

This aspect enables several different sets of operations to be associated with the "same" time. For example, a first vector may be defined to perform one operation (or operations) at time "a" when the system is in a first operating condition. In addition, a second vector may be defined to perform another operation (or operations) also at time "a" but when the system is in a second operating condition. Thus, the operation (or operations) associated with only one of the vectors will be performed at time "a."

Through the use of these vectors, the processor may not need to control the execution of the time-dependent operations in real-time. As a result, processing resources in the system may be freed up for other tasks or less processing power may be required in the system.

Moreover, the system may provide for more precise initiation of time-dependent operations. For example, the hardware component may be configured to initiate operations at relatively precise times. In other words, the hardware component may be configured to track time in relatively small intervals. In contrast, it may be impractical to track time as precisely in a conventional system where the processor directly controls initiation of time-dependent operations.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
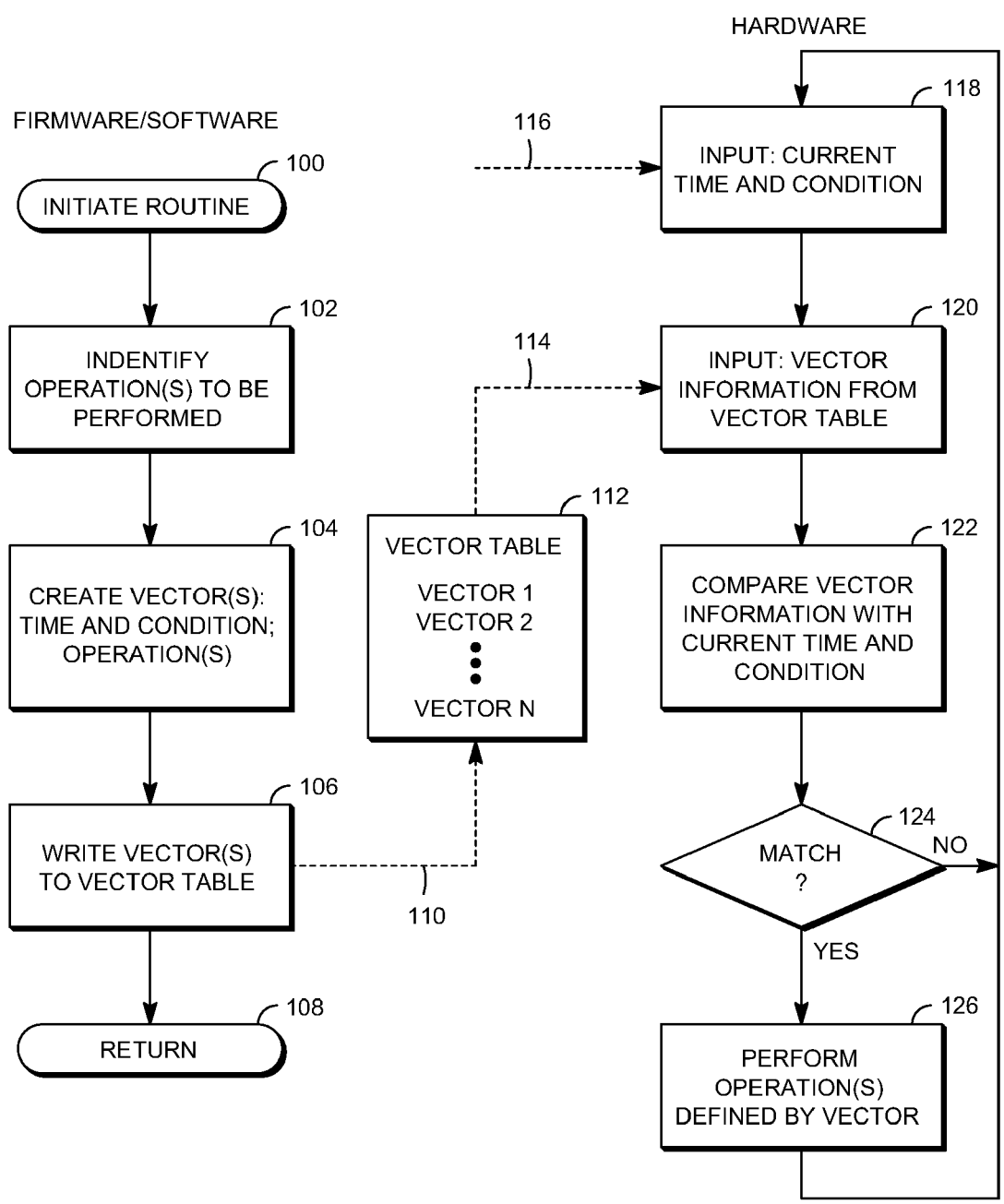
FIG. 1 is a flow chart of one embodiment of operations that may be performed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 describes one embodiment of operations that may be performed in a system constructed in accordance with the invention. In general, operations performed by firmware/software are represented by blocks 100-110 on the left side of FIG. 1 and operations performed by hardware are represented by blocks 114-126 on the right side of FIG. 1.

Initially, as represented by block 100, a firmware or software routine (for convenience the term firmware will be used in the discussions that follow) is invoked that may, in some instances, cause a vector to be defined.

Typically the firmware routine is invoked by an interrupt. For example, an interrupt may be associated with the receipt or transmission of data. These data transfers, in turn, may be associated with time-dependent operations.

Alternatively, the firmware routine may be invoked by a polling routine. In any event, as represented by block 102, the firmware routine may determine that one or more time-dependent operations need to be performed in the near future.

At block 104, the firmware creates a vector that may include, for example, a time value associated with a time reference, an operating condition and one or more operations to be performed at the defined time and operating condition. Examples of time values include, without limitation, a value associated with time from a real time clock or a value associated with a timing sequence in the system. An example of the latter is a bit count associated with frames of data being transmitted or received. Examples of operating conditions include, without limitation, whether a device is currently transmitting or receiving or the type of information being transmitted or received. Examples of operations include, without limitation, a write to a register or a read of a register. In these cases the operation-related information stored in the vector may include the address of the register, the data to be written and/or a location to store data that was read.

Next, at block 106, the firmware stores the vector in a vector table 112 as represented by a dashed line 110 to the vector table 112. The vector table may contain one or more vectors (e.g., vector 1 through vector N).

As represented by block 108, the firmware routine then returns to the calling routine (e.g., returns from the interrupt). Significantly, the firmware routine does not need to check a clock to initiate the operations. Rather, this part of the process is handled by the hardware.

Referring now to the right side of FIG. 1, as represented by a dashed line 116, one input to the hardware is the current time as defined by a time reference and the current operating condition (e.g., state) of the system (block 118).

As represent by a dashed line 114 from the vector table 112, another input to the hardware is the vector information (block 120). This information includes, for example, the time, operating condition and operation(s) information.

As represented by block 122, the hardware compares the current time with the time from each vector. In addition, as discussed above, different operations may be defined to be performed at the "same" time, but under different operating conditions in the system. Consequently, the hardware may optionally compare the current operating condition with the operating conditions in each vector.

When there is a match at block 124, the hardware causes the operation (or operations) defined in the matching vector to be performed (block 126).

If there is no match or after the operations are performed, the hardware continues to compare the current time (and operating condition) with the time (and operating condition) in the vectors. Hence, the operation flow returns to block 118 where the above process is repeated. New operations will be performed once the current time and conditions change to match the vectors currently in the vector table or vectors that are added to the vector table in the future.

In some cases, the system will be configured so that the hardware provides an indication that the operation(s) associated with a vector have been initiated and/or performed. For example, the hardware may set a value in a status register. Here, the firmware may then delete the vector from the vector table once a defined operation has been performed. Alternatively, for a vector that involves processing over a given period of time the firmware may automatically reprogram the vector once the time expires.

In some cases, the firmware may delete the vector from the vector table based on other factors. For example, the firmware may know that an operation was to be performed at a certain time and may (using, for example, low resolution clock checking) delete the vector after that time.

Figure 2:
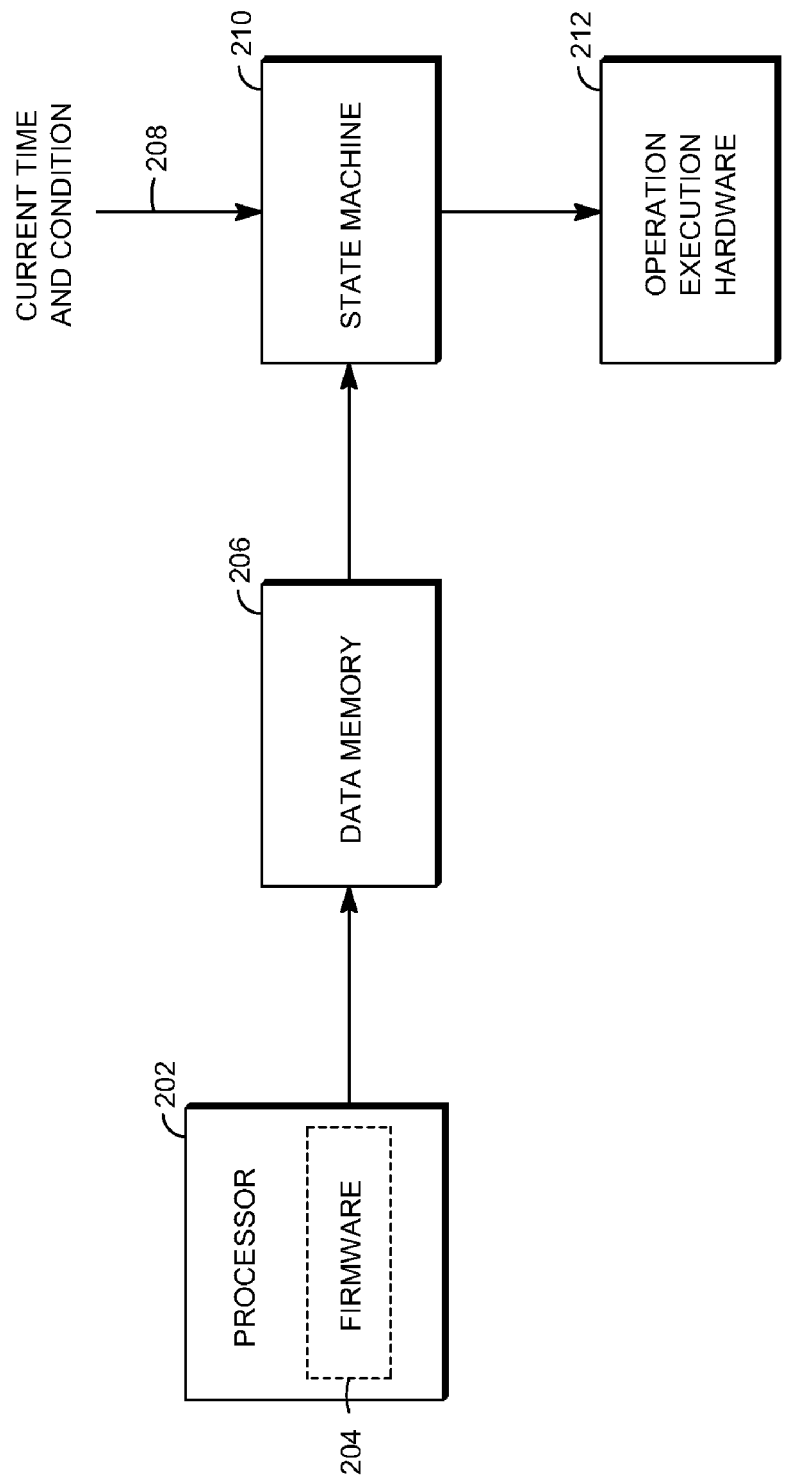
FIG. 2 is a simplified block diagram of one embodiment of a system constructed in accordance with the invention.

FIG. 2 depicts one embodiment of a system 200 constructed in accordance with the invention. Here, a processor 202 executes various firmware routines 204, some of which relate to time-dependent operations.

The vector table may be stored in a data memory 206 such as a register. Thus, the firmware routines 204 write vectors to the data memory 206 that is also accessible by a state machine 210.

The state machine 210 also has as inputs the current time and current operating 208 condition of the system 200. In some embodiments the time input is an output signal from a real time clock (not shown). In other embodiments the time input may be a clock signal associated with data transmission (e.g., frame or bit count). In general the time signal may be any signal or signals that serve to indicate a time at which one or more time-dependent operations need to be performed. Such a time signal may be generated, for example, by a timing circuit such as clock generator or a frame generator (not shown).

The operating condition inputs may be, for example, signals or data that indicate what is happening in the system. These signals or data may be generated by various circuits and/or processors in the system 200 that generate and/or sense such conditions and may be stored in status registers in the system 200. As an example, a transmit enable signal may indicate that the system 200 is currently transmitting data.

When there is a match, the state machine 210 may cooperate with other hardware 212 to cause the appropriate operations to be performed. As discussed above, this may simply involve, for example, writing the defined data to the defined address.

Figure 3:
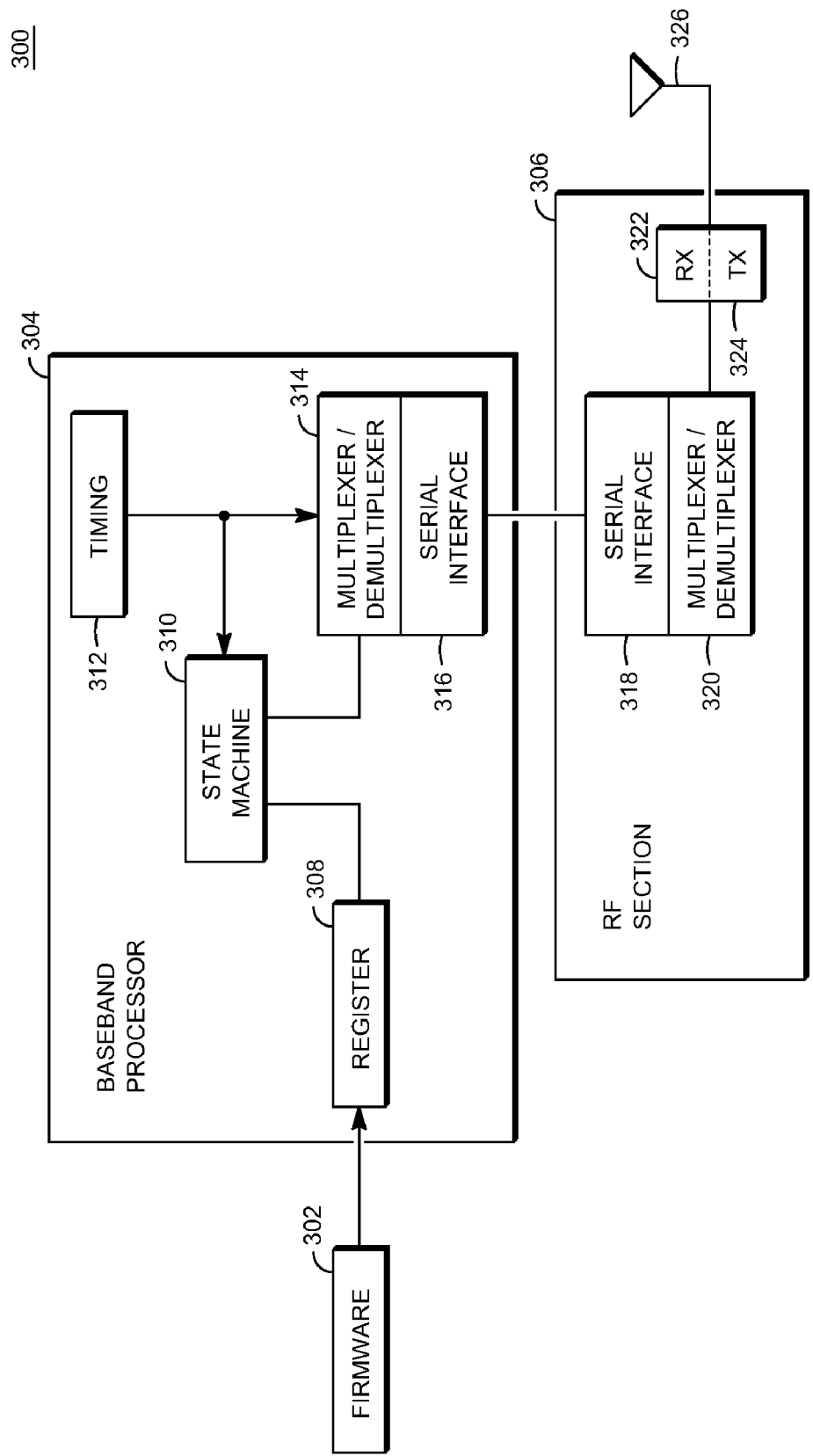
FIG. 3 is a simplified block diagram of one embodiment of a communication system constructed in accordance with the invention.

FIG. 3 illustrates one embodiment of a transceiver 300 (e.g., a Bluetooth transceiver) constructed in accordance with the invention. The transceiver 300 includes firmware 302 operating on a processor (not shown), a baseband processor 304 and an RF section 306. The RF section 306 includes a radio transmit ("TX") component 324 and a radio receive ("RX") component 322 that send and receive messages, respectively, over the airwaves via an antenna 326. The baseband processor 304 serves to format/unformat data sent/received by the RF section 306 in accordance with the protocol (e.g., Bluetooth) supported by the transceiver 300. In general, the firmware 302 provides functionality at a higher data communication layer to, for example, facilitate communication with other transceivers via the airwaves.

In a manner similar to the structure described in conjunction with FIG. 2, the transceiver 300 may be configured to support vectors for time-dependent operations. For example, the firmware 302 may generate vectors and store them in a vector table in a register 308 in the baseband processor 304. In addition, the baseband processor 304 includes a hardware state machine 310 that compares the vectors with the current "time" and operating condition of the baseband processor 304. The baseband processor 304 also includes timing circuitry 312 that generates timing information used by the state machine 310 and other components in the transceiver 300.

Figure 4:
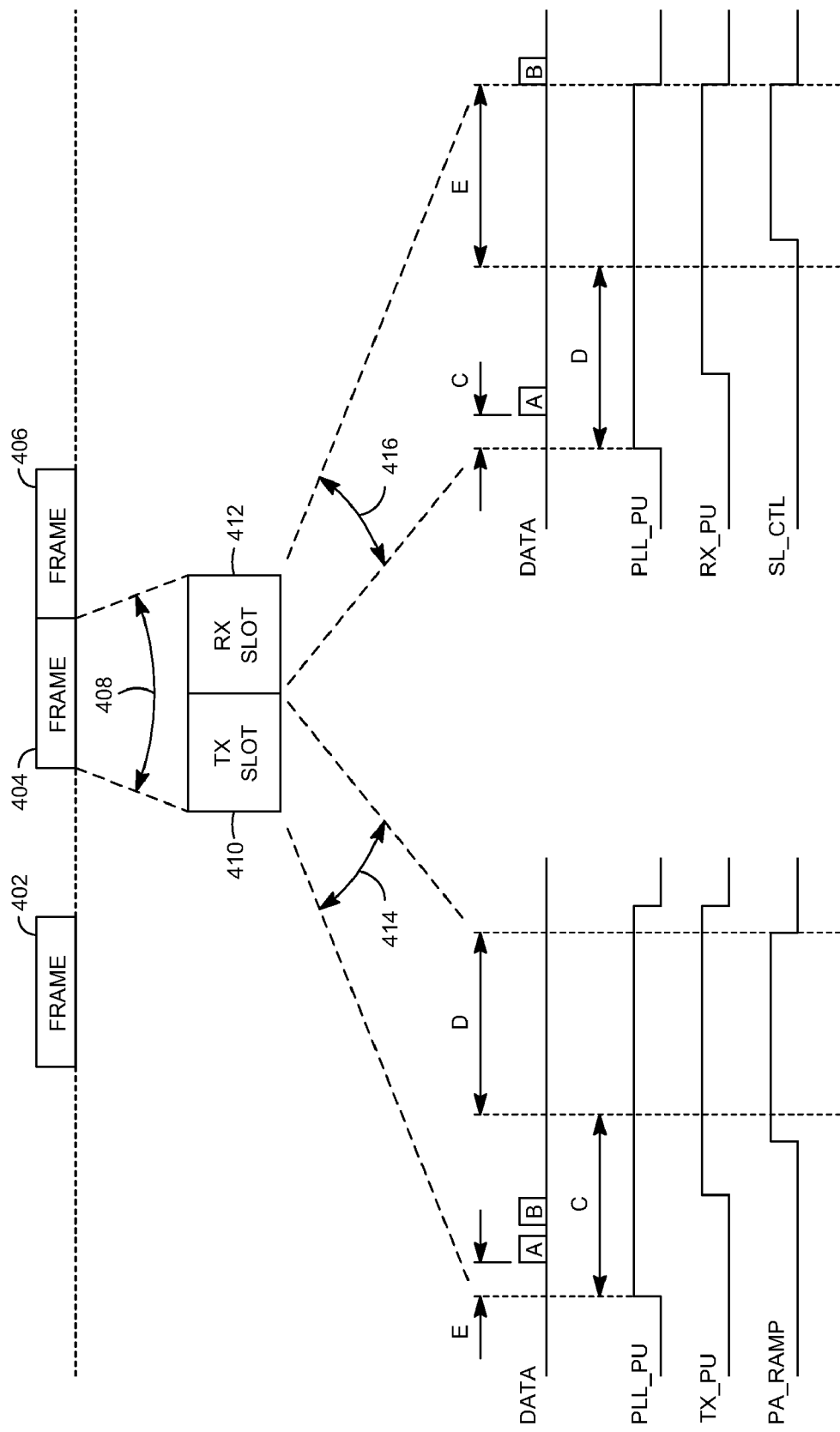
FIG. 4 is a simplified diagram of one embodiment of timing in a communication system constructed in accordance with the invention.

A wireless protocol such a Bluetooth specifies that certain information is to be provided over the airwaves at certain times, relative to, for example, the beginning of a transmit or receive operation (e.g., the beginning of a frame). FIG. 4 illustrates a simplified example of one embodiment of timing in a Bluetooth system. Here, information in the form of data frames (e.g., frames 402, 404 and 406) are periodically sent and received over the airwaves.

As represented by the dashed lines 408, a frame typically consists of two slots: a transmit slot 410 and a receive slot 412. In some cases, however, a frame may be defined to include more than two slots (not shown).

The system transmits and receives data using a frequency hopping scheme. For example, the transmitter transmits each consecutive TX slot at a different frequency. In addition, the receiver receives each consecutive RX slot at a different frequency. Moreover, the frequency for the TX slot and the RX slot will typically be different. As a result, the operating frequency of the transceiver 300 is continually being changed.

Changing the frequency of the transceiver 300 typically involves reprogramming a frequency synthesizer (e.g., including a phase lock loop, "PLL"). Typically, the same frequency synthesizer is used for both transmit and receive operations.

In addition, to save power and reduce the interference in the airwaves, the transmitter and receiver are only powered during a given TX slot or RX slot, respectively. Thus, the transmit and receive sections of the transceiver 300 are continually being powered on, programmed in frequency, then powered off.

Moreover, a typical requirement is that the frequency synthesizer cannot be programmed while data is being transmitted or received. Accordingly, it is important that the transceiver 300 be programmed at the appropriate times. In other words, operations that program the transceiver 300 may be time-dependent.

Examples of time-dependent operations are described in the bottom of FIG. 4 for one embodiment of a transceiver. As represented by dashed lines 414, the timing diagram on the lower left side of FIG. 4 relates to a TX slot. As represented by dashed lines 416, the timing diagram on the lower right side relates to an RX slot.

For the TX slot, after the frequency synthesizer is powered up (rising edge of the PLL_PU signal) the frequency must be programmed within approximately $t_1$ μS (time E). In addition, the TX slot data is transmitted (time D) at least $t_2$ μS (time C) after the PLL_PU transition. FIG. 4 also shows that the transmitter must be powered up (TX_PU) and the power amplifier must be ramped up (PA_RAMP) at predefined times before the TX slot data is transmitted.

Accordingly, in the embodiment of FIG. 4, the transmitter is programmed at times A and B to set the frequency of the frequency synthesizer and the power of the transmitter, respectively. Due to the restrictions discussed above, these programming operations are time-dependent.

In addition, any other operations to be performed on the transmitter during the TX slot would need to be performed before time D, but not during time A or B. Accordingly, these operations may also be somewhat time-dependent.

For the RX slot (FIG. 4, lower right), after the frequency synthesizer is powered up (rising edge of the PLL_PU signal) the frequency must be programmed within approximately $t_1$ μS (time C). In addition, the RX slot data is received (time E) at least $t_2$ μS (time D) after the PLL_PU transition. FIG. 4 also shows that the receiver must be powered up (RX_PU) at a predefined time before the RX slot data is received and that a receive signal strength indicator ("RSSI") (data B) is read out after receiving the last bit of the RX slot data.

Accordingly, in the embodiment of FIG. 4, the receiver is programmed at time A to set the frequency of the frequency synthesizer. Due to the restrictions discussed above, this programming operation is time-dependent.

In addition, any other operations to be performed on the receiver during the RX slot would need to be performed before time E, but not during time A. Accordingly, these operations may also be somewhat time-dependent.

In some embodiments, the baseband processor 304 (FIG. 3) is configured to program the RF section 306 to perform the time-dependent operations at the proper time. Consequently, the baseband processor 304 may be configured to send the appropriate command and data to the RF section 306 at the proper time. For example, the synthesizer frequency programming command must be sent at an appropriate time relative to PLL_PU as discussed above. The baseband processor 304 may send this command as part of the normal frequency hopping procedure. In addition, the firmware 302 may initiate this command to change the frequency, for example, in response to interference in the transceiver's operating spectrum. The hardware (e.g., the baseband processor 304) is then responsible for ensuring that the operation is performed at the proper time.

Also, commands for other operations may need to be sent at times that do not conflict with, for example, times A, B and D in a TX slot. Such commands may include, for example, setting the automatic gain control. Again, the baseband processor 304 is responsible for ensuring that the operation is performed at the proper time. To this end, the baseband processor 304 may keep track of (e.g., in a table) which slots/phases (e.g., as described below) are currently assigned to certain operations and which slots/phases are available for use by other operations.

At a higher level (e.g., frame level), the firmware 302 may keep track of when operations may be performed. For example, SCO (voice traffic) may be defined to use every third frame. In this case, the firmware 302 may program the transceiver 300 to use the frames between the SCO frames to perform various operations.

To accomplish the desired timing, the firmware 302 and the baseband processor 304 may use vectors as discussed herein to specify the times at which certain operations are performed. In some embodiments, the timing for these operations may be defined in terms of a low resolution clock and a high resolution clock. For example, a low resolution clock may consist of a slot count (e.g., a Bluetooth half slot, 0.325 mS) and a high resolution clock may consist of a timing interval (referred to as "phase") that divides each slot into subsets of time (e.g., µS resolution). Thus, operations may be defined to occur during a particular slot (e.g., the RX slot in FIG. 4) and at a particular time within that slot (e.g., a particular time after time A but before time E). In this case, the vector would include fields for the slot count and the phase count. In general, the firmware 302 defines the values in these fields so that a given operation will complete before the next operation begins. For example, the phase counts between two subsequent operations will differ by an appropriate amount.

In addition, the vector may include operating condition information that affects which operations are performed at a given time. Examples of operating conditions include whether the transceiver is in a page scan mode, a coexistence mode, a quality of service mode or a connection mode.

A variety of operations may be defined in a vector. For example, an operation may include collecting status information or operating parameters (e.g., receive sensitivity). Operations may be related to channel classification involved in 802.11 coexistence. In these cases, the firmware 302 may schedule the operations to be performed during the unused portions of the slot (e.g., after time A, but before time E in the RX slot).

The baseband processor 304 and the RF section 306 communicate via an interface. In the embodiment of FIG. 3, this interface is a serial interface. To this end the baseband processor 304 and the RF section 306 include multiplexer/demultiplexer components 314, 320 and serial interface components 316, 318, respectively, that format and unformat data sent over and received from a serial link. Thus, operations such as providing an instruction (e.g., an address of a register) and data (e.g., data to be written to the register) may then be transmitted as a serial stream over the link. It should be appreciated, however, that other interfaces (e.g., parallel) may be used to couple these components.

In the embodiment of FIG. 3, firmware operations 302 that generate vectors may be invoked, for example, by interrupts. These interrupts may be generated, for example, for every slot or when the RF section 306 receives data from the airwaves or when the processor (not shown) has data to be transmitted over the airwaves. Alternatively, the firmware 302 may be invoked by a polling scheme or some other scheme.

In some embodiments the state machine 310 may be configured to continuously and simultaneously monitor all of the vectors. For example, the vector table may be hard-wired to the state machine so that one or more of the variables (e.g., time, etc.) from each vector may be continually provided to the state machine.

Alternatively, the state machine 310 may be configured to scan through the vectors. For example, the state machine 310 may read a vector from memory 308, compare the vector, then repeat the process for the next vector.

In some embodiments, the state machine 310 may be configured to use a state count, phase count and bank select and offset structure to initiate processing operations. For example, upon a match of the state count and the phase count, the state machine 310 may use bank select and bank offset variables to access one or more operations (e.g., the associated instruction and data) that are to be performed.

From the above it should be appreciated that a system constructed in accordance with the invention may be configured and implemented in a variety of ways. For example, a variety of elements may be defined for a timing vector. Time may be tracked using a variety of signals in a system including, without limitation, a real time clock, transmit or receive frame information, frame counters, and system clocks. Various conditions/states may be defined in a system and used in conjunction with time to determine a given operation to be performed. A wide variety of operations to be performed may be associated with each vector. Different operations may be used to define each vector. Various hardware and/or software structures may be used to perform the hardware operations described herein. Various schemes may be used to periodically check the vectors and invoke operations.

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire while other signals may consist of RF signals transmitted through the air. A signal may comprise more than one signal. For example, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

In summary, the invention described herein generally relates to an improved timing system and method. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

The invention claimed is:

1. A system comprising:
   firmware configured to generate timing vectors, each timing vector including a time reference when an operation associated with the timing vector is to be executed;
   a processor configured to execute the firmware;
   a state machine configured to determine a current time of the system, wherein the state machine is configured to determine a matching time vector of a timing vector based on a comparison of the time reference of the timing vector to the current time; and
   operation execution hardware configured to execute the operation associated with the matching timing vector.

2. The system of claim 1 wherein the timing vectors include an operating condition that must exist for the operation associated with the timing vector to be executed.

3. The system of claim 2 wherein the state machine is configured to determine a current condition of the system and compare the current condition to the operating condition to determine the matching timing vector.

4. The system of claim 2 wherein the state machine is configured to determine that the operation condition exists.

5. The system of claim 2 wherein the operating condition is associated with the time reference.

6. The system of claim 1 wherein the state machine is configured to make the comparison independently of the processor.

7. The system of claim 1 wherein the operation execution hardware is configured to execute the operation independently of the processor.

8. The system of claim 1 wherein the state machine is configured to continually compare the current time to the time reference of the timing vectors.

9. The system of claim 1 wherein the state machine is configures to determine the operation to be executed based on a current condition of the system.

10. The system of claim 1 further comprising a vector table configured to store the timing vectors.

11. The system of claim 1 wherein the time reference is associated with a real-time clock.

12. The system of claim 1 wherein the time reference is associated with a sequence of execution.

13. The system of claim 1 wherein the time reference is associated with a Bluetooth slot.

14. The system of claim 1 wherein the time reference is associated with a frequency data hopping period.

15. The system of claim 9 wherein the current condition of the system comprises at least one of a coexistence, connect status, or quality of service.

16. The system of claim 1 wherein the system comprises a Bluetooth Tranceiver.

17. The system of claim 1 wherein the operation comprises setting a frequency of a tranceiver.

18. The system of claim 1 wherein the operation comprises a time-dependent operations.

19. A method of controlling execution of a plurality of operations in a system, the method comprising:
   defining a time reference associated with each one if the operations to be performed;
   defining, with a CPU, a timing vector corresponding to each time reference and the operation associated with the time reference;
   determining, with a state machine, a current time of the system;
   comparing, with the state machine, the current time to the time reference associated with each timing vector to identify matching timing vectors; and
   when a matching timing vector is identified, executing the operation associated With the matching timing vector.

20. The method of claim 19 wherein defining the time reference Comprises determining a real clock time of the system.

21. The method of claim 19 wherein defining the time reference Comprises determining an order of a sequence of processing of the system.

22. The method of claim 19 wherein defining the time reference comprises determining a bit count associated with date.

23. The method of claim 19 wherein executing the operation associated with The matching timing vector comprises executing the operation only if a predetermined state of the system exists.

24. The method of claim 23 wherein comparing the current time to the time reference associated with each timing vector comprises comparing, by the state machine, a current condition of the system to the state to determine the matching timing vector.

25. The method of claim 23 wherein determining, with a state machine, a current time of the system comprises determining the current condition by the state machine.

26. The method of claim 23 wherein comparing the current time to the time reference associated with each timing vector comprises determining that the system is not receiving a signal during the state of the system.

27. the method of claim 23 wherein comparing the current time to the time reference associated with each timing vector comprises determining that the system is not transmitting a signal during the state of the system.

28. The method of claim 19 wherein executing the operation associated with the matching timing vector comprises determining that the system is not receiving or transmitting a signal.

29. The method of claim 19 wherein executing the operation associated with the matching timing vector comprises executing the operation associated with the matching timing vector by the state machine.

30. A tranceiver configures to receive and transmit wireless signals, the tranceiver comprising:
   a register comfigured to store the timing vectors, each timing vector including a time reference and one or more operations to be performed when the time reference equals a system time of the tranceiver;
   firmware configured to generate the timing vectors, each timing vector including a time reference for when an operation associated with the timing vector is to be executed;
   a processor configured to execute the firmware;
   a timing circuitry configured to generate timing information of the tranceiver, including the system time;
   a state machine configures to compare the system time to the time reference from each of the one or more timing vectors to determine a matching timing vector and perform the one or more operations of the matching timing vector, wherein the one or more operations of the matching vector cannot be performed during a receipt or Transmission of the one or more wireless signals.

31. The tranceiver of claim 30 configured to receive and transmit one or more Bluetooth signals.

32. The tranceiver of claim 30 configures receive and transmit the one or more wireless signals while implementing a frequency hopping algorithm.

33. The tranceiver of claim 30 comprising a receiver and a transmitter.

34. The tranceiver of claim 30 wherein the processor is configured to define each timing vector.

35. The tranceiver of claim 30 wherein the state machine is configured to compare the system time to the time reference independently of the processor.

36. The tranceiver of claim 30 wherein an RF section of the tranceiver is configured to perform the one or more operations of the matching timing vector.

37. The tranceiver of claim 30 wherein the timing circuitry is configured to determine a bit count associated with frames of data transmit or received by the tranceiver.

* * * * *